Jan. 20, 1959 SUNG-CHING LING 2,870,305
CONSTRUCTIONS FOR ANEMOMETERS OF THE HOT WIRE TYPE
Filed April 4, 1955 2 Sheets-Sheet 1
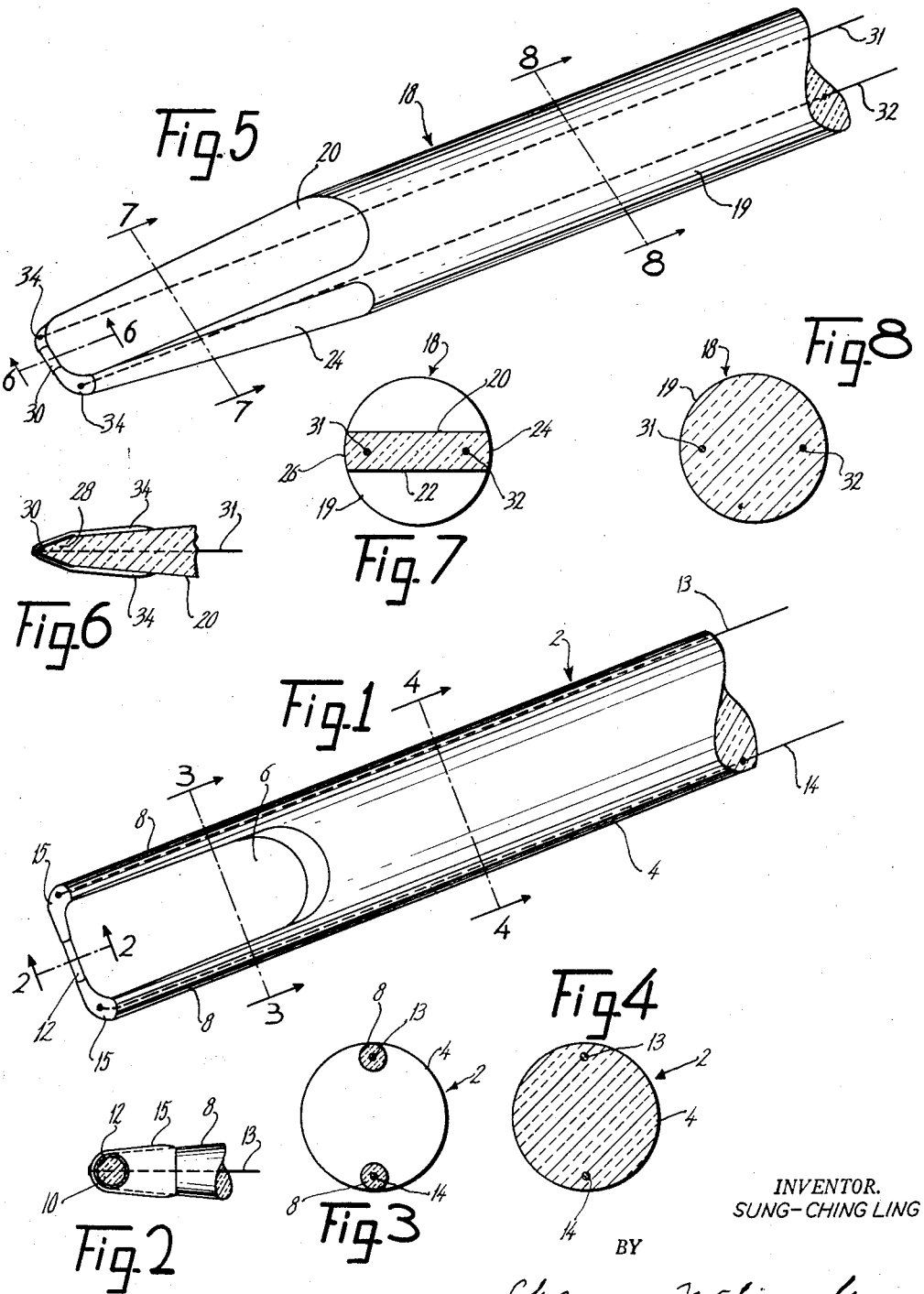
INVENTOR.
SUNG-CHING LING
BY
Chauncey M. Sincerbeaux
ATTORNEY Jan. 20, 1959  SUNG-CHING LING  2,870,305
CONSTRUCTIONS FOR ANEMOMETERS OF THE HOT WIRE TYPE
Filed April 4, 1955  2 Sheets-Sheet 2
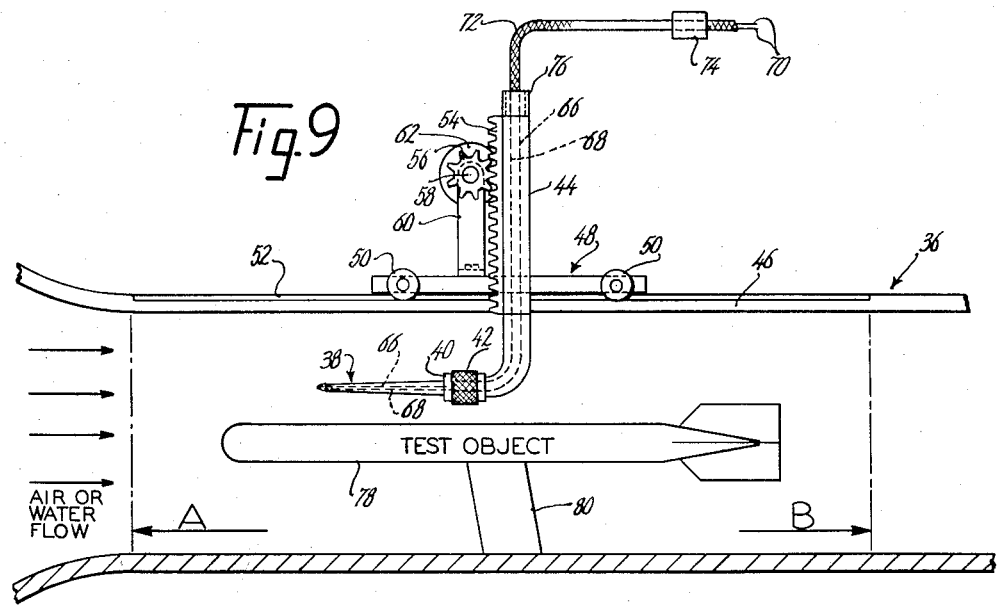
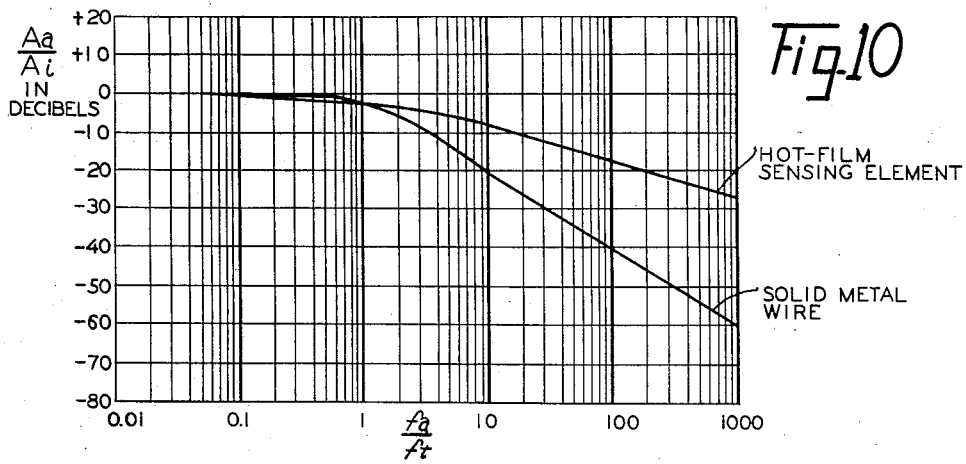
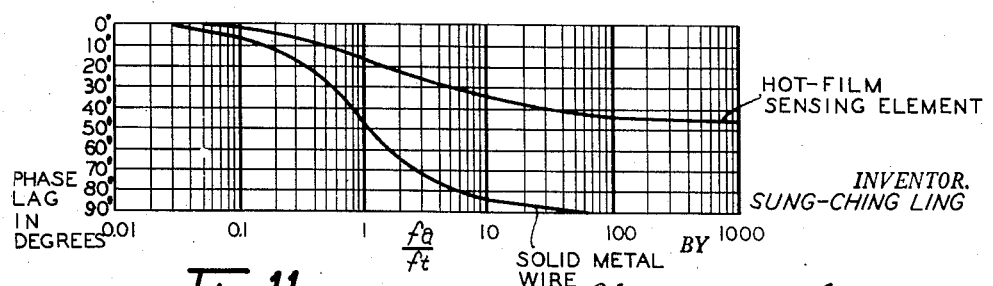
INVENTOR.
SUNG-CHING LING
BY Chauncey M. Sincerbeaux
ATTORNEY

United States Patent Office 2,870,305
Patented Jan. 20, 1959

2,870,305

CONSTRUCTIONS FOR ANEMOMETERS OF THE HOT WIRE TYPE

Sung-Ching Ling, Iowa City, Iowa

Application April 4, 1955, Serial No. 498,818

9 Claims. (Cl. 201—63)

This invention relates to devices for measuring the rate of flow of gases and other fluids, known in the art as anemometers, and more particularly to anemometers of the hot wire type. An example of such an anemometer is shown and described in an article on pages 236 and 237 of a publication entitled "Measurement Techniques in Mechanical Engineering" by R. J. Sweeney published by John Wiley & Sons, Inc., New York, 1953. The patent to Eder, No. 2,389,615, dated November 27, 1945 also shows and describes an anemometer of this type.

In the usual hot wire anemometer a solid metal wire is immersed in a fluid the rate of flow of which is to be measured and is heated by the passage of an electric current through the same. The passage of the relatively cool fluid past the wire in contact therewith causes variations in the temperature of the wire and corresponding variations in the electrical resistance of the wire.

The rate of heat exchange between the heated wire and the fluid or gas in which it is immersed is a function of the mass rate or velocity of the fluid or gas. The heat Q dissipated by the heated wire of a hot wire anemometer is equal to the product of two electrical parameters, namely, the square of the electrical heating current $I^2$ and the resistance R of the hot wire. There are two customary methods of operating hot wire anemometers. In one method, known as the Constant Current Operation, the heating current is kept constant and the variation of heat exchange between the hot wire and the fluid in which it is immersed is measured as a function of the variation of hot wire resistance. In the other method, known as the Constant Temperature Operation, the resistance of the wire is kept at a constant value by electrical servo controlled means and the variation of heat exchange between the hot wire and fluid in which it is immersed is measured as a function of the variation in the heating current.

It is highly desirable that the hot wire should be able to respond instantly to an instantaneous fluctuation in the rate of flow of the fluid in which it is immersed. Assume that a solid metal hot wire, immersed in a flowing fluid is subjected to a sudden increase in the velocity of flow of the fluid in contact with the same, the temperature of the surface of the wire will drop immediately but the temperature drop of the portions of the wire beneath the surface will lag behind the drop in the surface temperature to a degree depending on the distance of each portion beneath the surface from said surface. This lag is due to the thermo resistance and the heat stored in the wire. The detecting devices are controlled, not by the surface temperature of the wire, but by the average temperature of the portions of the wire at different distances from the surface. The signal will therefore lag behind the time of the actual disturbance.

One object of the present invention is to produce a sensing element for anemometers of the hot wire type which is much more sensitive to changes in the rate of flow of the fluid in which said element is immersed than the usual sensing elements of anemometers of the hot-wire type.

Another object of the invention is to provide a sensing element for anemometers of the hot-wire type which is responsive to fluctuations of great rapidity in the rate of flow of the fluid in which the element is immersed.

With the above and other objects in view the invention consists in a hot element for anemometers of the hot-wire type, said element embodying the novel and improved construction hereinafter described and particularly pointed out in the claims, the advantages of which will be readily understood and appreciated by those skilled in the art.

The invention will be clearly understood from the accompanying drawing illustrating constructions embodying the invention in its preferred forms and the following detailed description of the constructions therein shown.

In the drawings,

Fig. 1 is a plan view illustrating one form of probe having a hot-element construction embodying the invention.

Fig. 2 is a detail sectional view of the hot-element portion of the probe shown in Fig. 1 taken in a plane substantially perpendicular to the lengthwise dimension of said hot-element portion substantially on the line 2—2 of Fig. 1.

Fig. 3 is a detail sectional view of the probe shown in Fig. 1 taken in a plane substantially perpendicular to the axis of the probe substantially on the line 3—3 of Fig. 1.

Fig. 4 is a detail sectional view of the probe shown in Fig. 1 taken in a plane substantially perpendicular to the axis of the probe on the line 4—4 of Fig. 1.

Fig. 5 is a perspective view illustrating another form of probe having a hot-element construction embodying the invention.

Fig. 6 is a detail sectional view of the hot-element portion of the probe shown in Fig. 5 taken in a plane substantially perpendicular to the lengthwise dimension of said hot-element portion substantially on the line 6—6 of Fig. 5.

Fig. 7 is a detail sectional view of the probe shown in Fig. 5 taken in a plane substantially perpendicular to the axis of the probe substantially on the line 7—7 of Fig. 5.

Fig. 8 is a detail sectional view of the probe shown in Fig. 5 taken in a plane substantially perpendicular to the axis of the probe substantially on the line 8—8 of Fig. 5.

Fig. 9 is a view partly in front elevation and partly in vertical section illustrating a probe such as those shown in Figs. 1 to 8 inclusive mounted in a test tunnel in position for testing the rate of flow of air, gas or other fluid through the tunnel.

Fig. 10 is a copy of a chart showing the dynamic response characteristics of the hot film sensing element including, for comparison, the response characteristics of a hot-wire sensing element, and Fig. 11 is a copy of a chart showing the phase lag of a hot film sensing element and, for comparison, the phase lag of one of the usual hot-wire sensing elements.

In the present construction a hot sensing element is substituted for the usual hot wire of prior anemometers of the hot-wire type. This hot element comprises two major component parts, namely, a supporting body and an extremely tenuous metal film supported on said body. The supporting body is made of material which is a nonconductor of electrical current.

The sensing element may be constructed in different cross-sectional shapes to suit the requirements of different applications. The metal film, which may be hereinafter termed the hot film, is made of a metal having a high temperature coefficient of resistance. The said film is attached to the surface of the supporting body in a manner suitable to cause the film to adhere to said body with a strong adhesive force at all times under the conditions to which the hot element is subjected during the operation of the anemometer.

In the form of the invention shown in Figs. 1, 2, 3 and 4, the hot element embodying the invention is applied to a probe indicated as a whole at 2. This probe comprises a relatively slender body 4 forming a rod substantially cylindrical in cross section and made of material which is a nonconductor of electric current such as glass quartz or ceramic or other similar materials. In the preferred construction, the rod is made of glass. The rod is tapered beginning at a point to the left of the line 4—4, of Fig. 1, and its left end portion is formed with an opening 6 and with two substantially parallel spaced rod-like tapered extensions 8 located on opposite sides of said opening. The end portions of these extensions are turned inwardly into alignment and are connected by a rod-like transverse element 10 which may be formed integrally with said extensions. The parts of the probe thus far described are all made of glass or similar material which is a nonconductor of electric current.

The rod 10 forms the supporting body constituting one of the major component parts of the hot element of the anemometer. Surrounding this rod is a microscopically thin metal film 12 constituting the other major component part of the hot element of the anemometer. This hot film may have a thickness of substantially one millionth of an inch. The film is made of metal having a relatively high temperature coefficient of resistance such as rhodium, platinum, gold, tungsten and other similar metals and their alloys. This film is secured to the surface of the rod 10 in any manner suitable to cause the film to adhere to the rod with a relatively strong adhesive force. The film may be fused to the surface of the rod by means of chemical reduction under heat or it may be sputtered on the rod in a vacuum chamber.

The means for connecting the film of the hot element with the source of current comprises two electrical conductors 13 and 14 preferably made of platinum and extending through the body 4 of the probe and through the extensions 8 on said body. The end margins of the film 12 of the hot element are connected respectively with the adjacent margins of two relatively heavy platings of conducting metal 15, preferably of platinum, applied to the glass of the probe and respectively surrounding the adjacent portions of the extensions 8, the film and the metal platings overlapping at their adjacent margins. The conductors 13 and 14 extend completely through to the outer surface of the rod-like extensions 8 at the respective points at which the end portions of said extensions are turned inwardly, and said conductors are connected respectively with the platings 15 of metal. The hot-element consisting of the supporting rod 10 with the coating film of metal may be made of the same size as the size of the usual hot wire.

With this construction the signal detected upon a change in the rate of flow of the fluid in which the hot element is immersed will be given by a change in the surface temperature of the wire, that is, the temperature of the film 12. Hence, much faster signal responses to actual disturbances in the rate of flow of the fluid will be given than can be given by the usual hot solid metal wire.

In the form of the invention shown in Figs. 5, 6, 7 and 8, the hot element embodying the invention is applied to a probe indicated as a whole at 18. This probe comprises a relatively slender body 19 forming a rod substantially cylindrical in cross section and made of material which is a nonconductor of electric current such as glass quartz or ceramic materials. In the preferred construction this rod is made of glass.

The rod is beveled off at 20 and 22 adjacent one end thereof and also at 24 and 26 to form a tapered end portion extending some distance from the left end, Fig. 5, of the rod. The rod is formed with an extreme end portion or tip 28 having a wedge formation as shown in Fig. 6. The upper and lower faces of the wedge shaped tip of the rod may be formed at angles varying between 15° and 45° with relation to each other for use in different applications. The parts of the probe shown in Fig. 5 thus far described are all made of glass or similar material. The tip portion 28 of the glass of the rod forms the supporting body of the hot element in this construction. The upper and lower faces of said tip 28 are coated with an extremely tenuous film 30 of metal which forms the hot film of the hot element of the anemometer in this construction. This film forms a microscopically thin layer and its thickness may be substantially one millionth part of an inch. This film is made of a metal having a high temperature coefficient of resistance such as platinum, rhodium, gold, tungsten and similar metals and their alloys. This hot film is attached to the upper and lower faces of the tip 28 of the supporting body so that it will adhere to said faces with a strong adhesive force at all times under the conditions to which the hot element is subjected in the operation of the anemometer. The film may be fused to said surfaces of the supporting body by means of chemical reduction under heat or it may be sputtered on said surfaces in a vacuum chamber.

The means for connecting the hot film of the hot element with the source of current comprises two electrical conductors 31 and 32 preferably made of platinum and extending through the body of the probe and through the tapered end portion and into the wedge shaped tip. The end margins of the hot film are connected with the adjacent margins respectively of two relatively heavy platings 34 of metal, preferably platinum, applied to the glass of the tip of the probe on opposite sides of the hot film and said metal platings overlapping respectively the adjacent margins of the hot film. Each of the conductors 31 and 32 extends through the forward tapered portion of the probe to the outside thereof and is connected at its forward end with the corresponding one of the platings 34 on said tip.

With the latter construction, the signal, upon a change in the rate of flow of the fluid in which the hot element is immersed, will be given by a change in the surface temperature of the hot element comprising the hot film supporting wedge shaped glass tip of the tapered end portion of the probe and the hot film itself attached to said tip, that is, by a change in the temperature of the film. Hence, much faster signal responses to actual disturbances in the rate of flow of the fluid will be given than can be given by the usual hot wire of solid metal.

The probe shown in Fig. 1 is particularly suitable for use in measuring the rate of flow of fluids of relatively low velocity. The probe shown in Fig. 5 is particularly suitable for measuring the rate of flow of fluids of relatively high velocity or supersonic flow where absolutely rigid probe support is essential.

Current is supplied to the conductors 13 and 14 of the construction shown in Figs. 1 to 4 inclusive or to the wires 31 and 32 of the construction shown in Figs. 5 to 8 inclusive from a storage battery or from any other suitable source of current to heat the hot film of the hot element. The hot element comprising the supporting structure and the hot film supported on said structure may be applied to the usual system of circuits employed in anemometers of the hot wire type, the hot element of the present construction being substituted for the hot wire of the usual construction.

The hot element comprising the glass supporting rod and the microscopic hot film supported on said rod shown in Figs. 1 to 4 inclusive may be substituted for the hot wire of the anemometer shown and described in the John Wiley & Sons, Inc. publication or for the hot wire 14 of the anemometer shown and described in the patent to Eder, No. 2,389,615. The hot element comprising the V-shaped glass supporting structure and the microscopic hot film supported on said structure shown in Figs. 5 to 8 inclusive also may be substituted for the hot wire shown and described in the said publication or for the hot wire shown and described in said patent. The manner in which the hot film, in each case, is connected with the wires of the system of circuits of the anemometer of the publication or with the wires of the system of circuits of the anemometer of the patent will be understood by those skilled in the art without further explanation. The disclosure in said publication and the disclosure in said patent may be considered as part of the disclosure in this case.

With a hot element comprising a supporting structure and a hot film attached to and supported by said structure having the construction and arrangement shown in Figs. 1 to 4 inclusive or the construction and arrangement shown in Figs. 5 to 8 inclusive, the said element will have a relatively low degree of temperature conductivity.

In producing a structure embodying the basic principle of the present hot element construction for measuring the rate of flow of fluids at high temperatures, such as the rate of flow of gases from a jet engine, a glass tube may be used as the supporting structure to which the hot film is attached, and the tube may be cooled by passing a cooling fluid through the tube.

The hot element of the present construction may be made of various cross-sectional forms to suit the requirements of different tests to which the anemometer embodying this construction may be applied. In the construction of Fig. 1 of the drawing, the hot element has a circular cross section. In the construction of Fig. 5, the hot element has a wedge-shaped cross section. The hot element may be made in these and in various other cross-sectional shapes merely by varying the cross-sectional shape of the supporting body.

The superiority of a hot sensing element constructed as above shown and described over the customary hot-wire sensing element may be summarized as follows.

The hot element responds to high frequency signals without undue attenuation or excessive time lag.

The said element may be readily formed into any desired cross-sectional shape.

The said element is practically free from damage due to the engagement therewith of small foreign particles carried in the flowing stream.

The said element is free from noise created by aerodynamic vibration. In the usual anemometer of the present type, the hot-wire sensing element has the serious objection that it is highly susceptible to noise due to aerodynamic vibration. The usual hot-wire of such anemometers is also very susceptible to breakage. This is not true of the present construction which may be made in a form which is highly resistant to breakage or damage. This is particularly true of a construction such as that shown in Fig. 5.

By virtue of the physical nature of the supporting body of the hot-film sensing element, the sensing element can be operated at red-heat temperature such as encountered in the flow field of a jet engine. The usual hot-wire sensing element will not be able to support itself at red-heat temperature.

The extremely tenuous metal film fused to the glass, quartz or ceramic surface of the present construction is extremely stable against ageing and high temperature effects. The usual hot-wire is highly subject to ageing effects under high temperatures because of the changes made by the heat in its crystalline structure.

Fig. 9 shows one way in which probes of the character shown and described in this application may be used in testing the rate of flow of liquid or gas through a test tunnel. The test tunnel is indicated at 36 and the test mechanism is arranged to test the rate of flow in the section of the tunnel between the dot-and-dash lines indicated respectively by the arrows A and B.

The test mechanism shown comprises a probe 38 suitably supported within the test section of the tunnel with its tip end pointed in a direction opposite to the direction of flow of the fluid or gas in the tunnel indicated by the arrows within the left-hand portion of the tunnel. The probe may have a construction such as that shown in Figures 1, 2, 3 and 4 of the drawing or a construction such as that shown in Figures 5, 6, 7 and 8 including, in each case, the hot element of the corresponding probe and the means for supplying current to the hot film of said element. The probe is secured by means of a sleeve 40 and a connector plug 42 to the lower horizontal end portion of a metal tube 44 having a right-angled formation and extending from above the tunnel through a slot 46 in the tunnel wall into the interior of the tunnel. The tube is supported on a carriage 48 mounted upon the upper wall of the tunnel for adjustment longitudinally of the tunnel, the carriage having wheels 50 engaging a trackway 52 formed on the upper wall of the tunnel. A rack 54 is attached to the tube 44 and both tube and rack are supported on the carriage for vertical adjustment, the tube and rack being controlled in their vertical movements by suitable guides attached to the carriage. The tube 44 is adjusted vertically to adjust the vertical position of the probe in the tunnel by means of a gear 56 secured to a shaft 58 and engaging the teeth of the rack 54. The shaft 58 is rotatably mounted in a bearing supported at the upper end of an upright 60 the lower end of which is fixedly secured to the carriage 48. The carriage carries a hand wheel 62 by which the shaft 58 may be rotated manually to adjust the probe.

The conductors connected with the hot film of the hot element at the acting end of the probe are indicated at 66 and 68. These conductors are connected with leads 70 extending through the electric cable 72 passing through a suitable support and guide 74. The cable extends from said guide through a connector 76 mounted in the upper end of the metal tube 44 and, from this connector, the cable passes down into the lower end of the tube. The leads 70 extending from the cable are connected with the conductors 66 and 68 extending from the adjacent end of the body of the probe in any suitable manner within the plug 42.

With a mechanism such as that shown in Fig. 9 for supporting the probe, by adjusting the carriage 48 and thereby the probe in different positions longitudinally of the tunnel, the rate of flow of air, gas or other fluid in the test tunnel may be readily tested at different points longitudinally of the test section. With this mechanism, also by adjusting the shaft 58 and thereby adjusting the tube 44 and the probe vertically with relation to the test section of the tunnel, the rate of flow of gas, air or other fluid at different points transversely of said section may be readily tested.

Fig. 9 shows a test object 78 fixedly supported in the tunnel by an inclined post 80 secured to the lower wall of the tunnel. The test object may be a miniature of a full size object regarding which certain information as to its relation to rate of fluid flow is desired. With the mechanism shown in Fig. 9 for supporting and adjusting the probe, the probe may be readily adjusted in different positions longitudinally of the test object and in different positions transversely of the test object to test the rate of flow of the fluid at these points.

The dynamic response of the hot-film sensing element can be best expressed by its sinusoidal frequency response characteristics. This characteristic is plotted in Fig. 10 having as its ordinate the ratio of the actual absolute signal response $A_a$ to the ideal absolute signal $A_i$ which is the response at zero frequency (or static response), in decibels. The abscissa is plotted in logarithmic scale the dimensionless ratio of the actual frequency $f_a$ versus the frequency $f_t$ at which the response is $-3$ db. The corresponding phase lag versus the dimensionless frequency scale is given in Fig. 11.

The typical response curve and phase lag curve for various forms of hot-film are plotted in Fig. 10 and Fig. 11, in which are included the curves of a customary hot-wire for purpose of comparison. It is quite obvious that the response and phase lag characteristics of the hot-film are in all respects superior to the solid metal hot-wire.

It has been impossible, of course, to indicate in the drawings the thickness of the hot film of the hot element and the representations of the thickness of this film in the drawings are to be considered as diagrammatic. This is also true of the platings 15 and 34 and the representations of the thickness of these platings in the drawings also are to be considered as diagrammatic.

It is to be understood that except as defined in the claims, the invention is not limited to the particular construction of the illustrated embodiment of the invention but that this construction is merely illustrative of the invention and that the invention may be embodied in other forms within the scope of the claims.

Having explained the nature and object of the invention and having specifically described a construction embodying the invention in its preferred form, what is claimed is:

1. A construction for anemometers of the hot wire type comprising a hot sensing element arranged to be immersed in a fluid to be tested to determine the rate of flow of the fluid and having faces converging at an acute angle to each other, to be pointed in a direction opposite to the direction of flow of the fluid under test and including a supporting body of material constituting a nonconductor of electrical current, and a tenuous film of metallic material constituting a good conductor of electrical current and having a relatively high temperature coefficient of electrical resistance, extending over at least a portion of the surface of said body and rigidly attached to said surface, the film having its outer surface exposed to direct engagement by the fluid under test, means for supporting said body, and electrical conductors connected with said film at spaced points thereon for conducting an electrical current to and from said film to heat the same.

2. A construction for anemometers of the hot wire type comprising a hot sensing element arranged to be immersed in a fluid to be tested to determine the rate of flow of the fluid including a supporting body of material constituting a nonconductor of electrical current, and a microscopically tenuous film of metallic material constituting a good conductor of electrical current and having a relatively high temperature coefficient of electrical resistance extending over at least a portion of the surface of said body and rigidly attached to said surface, the film having its outer surface exposed to direct engagement by the fluid under test, means for supporting said body, and electrical conductors connected with said film at spaced points thereon for conducting an electrical current to and from said film to heat the same.

3. A construction for anemometers of the hot wire type comprising a hot sensing element arranged to be immersed in a fluid to be tested to determine the rate of flow thereof including a supporting body of material constituting a nonconductor of electrical current, and a microscopically tenuous film of metallic material constituting a good conductor of electrical current and having a relatively high temperature coefficient of electrical resistance extending over at least a part of the surface of said supporting body and fused to said surface, the film having its outer surface exposed to direct engagement by the fluid under test, means for supporting said body, and electrical conductors connected with said film at spaced points thereon for conducting an electrical current to and from said film to heat the same.

4. A construction for anemometers of the hot wire type comprising a hot sensing element arranged to be immersed in a fluid to be tested to determine the rate of flow of said fluid including a supporting body of material constituting a nonconductor of electrical current, and a microscopically tenuous film of metallic material constituting a good conductor of electrical current and having a relatively high temperature coefficient of electrical resistance extending over at least a part of the surface of said supporting body and rigidly attached to said surface, the film having its outer surface exposed to direct engagement by the fluid under test, means for supporting said body, spaced platings of conducting metal applied to said supporting means and connected respectively with said film at spaced points therein and electrical conductors connected respectively with said platings for conducting an electrical current to and from said film to heat the same.

5. A construction for anemometers of the hot wire type comprising a hot sensing element arranged to be immersed in a fluid to be tested to determine the rate of flow of said fluid and having faces converging at an acute angle to each other to be pointed in a direction opposite to the direction of flow of the fluid under test and including a supporting body of material constituting a nonconductor of electrical current, and a film of microscopic thinness made of metallic material and constituting a good conductor of electrical current and having a relatively high temperature coefficient of electrical resistance extending over at least a part of the surface of said body and rigidly attached to said surface, the film having its outer surface exposed to direct engagement by the fluid under test, means for supporting said body, and electrical conductors connected with said film at spaced points thereon for conducting an electrical current to and from said film to heat the same.

6. A construction for anemometers of the hot wire type comprising a hot sensing element arranged to be immersed in a fluid to be tested to determine the rate of flow of the fluid including a supporting body in the form of a rod and of material constituting a nonconductor of electrical current, and a tenuous tubular film made of metallic material and constituting a good conductor of electrical current and having a relatively high temperature coefficient of electrical resistance surrounding and rigidly attached to the surface of said rod formed supporting body, the film having its outer surface exposed to direct engagement by the fluid under test, means for supporting said body spaced platings of conducting metal applied to said supporting means and connected respectively with said tubular film at spaced points therein, and electrical conductors connected respectively with said tubular platings for conducting an electrical current to and from said film to heat the same.

7. A construction for anemometers of the hot wire type comprising a hot sensing element arranged to be immersed in a fluid to be tested to determine the rate of flow of the fluid including a supporting body having a wedge-shaped formation and consisting of material constituting a nonconductor of electrical current and a tenuous film made of metallic material and constituting a good conductor of electrical current extending over a substantial part of the surface of the wedge-shaped portion of said supporting body and fixed to said surface the film having its outer surface exposed to direct contact by the fluid under test, and electrical conductors connected with said film at spaced points thereon for conducting an electrical current to and from said film to heat the same.

8. A construction for anemometers of the hot wire type comprising a hot sensing element arranged to be immersed in a fluid to be tested to determine the rate of flow of said fluid including a supporting body of material constituting a nonconductor of electrical current, and a film of metallic material having a thickness of substantially one millionth of an inch constituting a good conductor of electrical current and having a relatively high temperature coefficient of electrical resistance extending over at least a part of the surface of said body and rigidly attached to said surface, the film having its outer surface exposed to direct contact by the fluid under test means for supporting said body, and electrical conductors connected with said film at spaced points thereon for conducting an electrical current to and from said film to heat the same.

9. A construction for anemometers of the hot wire type comprising a probe having a bar-like body and a tapered end portion and made mainly of material constituting a nonconductor of electrical current, a hot sensing element carried by said end portion and arranged to be immersed in a fluid to be tested to determine the rate of flow of the fluid, said element including a supporting structure of said material formed on said end portion and a tenuous film of metallic material constituting a good conductor of electrical current extending over at least a portion of the surface of said supporting structure and, fixed to said surface, said film having its outer surface exposed to direct contact by the fluid under test, and electrical conductors extending through said bar-like body and connected with said film at spaced points thereon for conducting an electrical current to and from said film to heat the same.

References Cited in the file of this patent

UNITED STATES PATENTS

| | | |
|---|---|---|
| 2,045,640 | Fredericks | June 30, 1936 |
| 2,136,991 | De Blois | Nov. 15, 1938 |
| 2,314,877 | Hall | Mar. 30, 1943 |
| 2,357,473 | Jira | Sept. 5, 1944 |
| 2,389,615 | Eder | Nov. 27, 1945 |
| 2,612,047 | Nilsson | Sept. 30, 1952 |

FOREIGN PATENTS

| | | |
|---|---|---|
| 704,162 | Great Britain | Feb. 19, 1951 |

OTHER REFERENCES

Sweeney's: "Measuring Techniques in Mechanical Engineering," Jno. Wiley & Sons, New York, 1953, pages 236, 237.